United States Patent
Kim et al.

(10) Patent No.: US 7,319,448 B2
(45) Date of Patent: Jan. 15, 2008

(54) LIQUID CRYSTAL DISPLAY DEVICE AND METHOD FOR DRIVING THE SAME

(75) Inventors: Kyong Seok Kim, Gyeonggi-Do (KR); Jae Kyun Lee, Gyeonggi-Do (KR)

(73) Assignee: LG.Philips LCD Co., Ltd., Seoul (KR)

( * ) Notice: Subject to any disclaimer, the term of this patent is extended or adjusted under 35 U.S.C. 154(b) by 626 days.

(21) Appl. No.: 10/866,997

(22) Filed: Jun. 15, 2004

(65) Prior Publication Data
US 2004/0263743 A1    Dec. 30, 2004

(30) Foreign Application Priority Data
Jun. 27, 2003  (KR) .................. 10-2003-0042830

(51) Int. Cl.
*G09G 3/36*    (2006.01)
(52) U.S. Cl. ...................................... 345/87; 345/139
(58) Field of Classification Search ............ 345/87–90, 345/91–103, 204–206, 208–210, 214; 349/1, 349/42–43, 46–47, 141–147
See application file for complete search history.

(56) References Cited

U.S. PATENT DOCUMENTS

| | | |
|---|---|---|
| 5,844,644 A | 12/1998 | Oh et al. |
| 6,300,926 B1 * | 10/2001 | Yoneya et al. ................. 345/87 |
| 6,421,039 B1 | 7/2002 | Moon et al. |
| 6,429,842 B1 * | 8/2002 | Shin et al. ..................... 345/92 |
| 6,646,691 B1 | 11/2003 | Watanabe et al. |
| 6,963,335 B2 | 11/2005 | Tanaka et al. |
| 2002/0140691 A1 * | 10/2002 | Sato et al. ................... 345/212 |

(Continued)

FOREIGN PATENT DOCUMENTS

CN    1184261    6/1998

(Continued)

*Primary Examiner*—Richard Hjerpe
*Assistant Examiner*—Mansour M. Said
(74) *Attorney, Agent, or Firm*—Morgan, Lewis & Bockius LLP

(57) ABSTRACT

A liquid crystal display device includes a plurality of pixel regions arranged on a first substrate, a plurality of first electrodes and a plurality of second electrodes individually provided at the pixel regions to form a horizontal electric field, a plurality of gate lines arranged on the first substrate along a horizontal direction to supply scan signals to the pixel regions, a plurality of data lines arranged on the first substrate along a longitudinal direction to supply image information to the pixel regions, a plurality of switching devices each provided at each of the pixel regions and having a first terminal connected to one of the gate lines, a second terminal connected to one of the data lines, and a third terminal connected to a first electrode of the pixel region, a plurality of first common voltage lines supplying a first common voltage to the second electrodes provided at the pixel regions of every odd-numbered first common voltage line, and a plurality of second common voltage lines supplying a second common voltage to second electrodes provided at the pixel regions of every even-numbered second common voltage line, wherein the first terminal of each of the switching devices provided at the pixel regions of a line unit is alternately connected to a $N^{th}$ gate line and a $N+1^{th}$ gate line (where N is an integer).

13 Claims, 7 Drawing Sheets

U.S. PATENT DOCUMENTS

2002/0190944 A1 12/2002 Morita
2004/0085503 A1* 5/2004 Kim et al. .................. 349/141

FOREIGN PATENT DOCUMENTS

| | | |
|---|---|---|
| DE | 197 44 448 C2 | 4/1998 |
| EP | 0466378 | 1/1992 |
| EP | 0 838 801 A1 | 4/1998 |
| EP | 0838801 | 4/1998 |
| JP | 10-124010 | 5/1998 |
| JP | 2001-033758 | 2/2001 |
| JP | 2002-72989 | 3/2002 |
| KR | 100304912 B1 | 7/2001 |
| KR | 1020030024640 A | 3/2003 |

* cited by examiner

LIQUID CRYSTAL DISPLAY DEVICE AND METHOD FOR DRIVING THE SAME

The present invention claims priority to Korean Patent Application No. 42830/2003, filed in Korea on Jun. 27, 2003, which is hereby incorporated by reference.

BACKGROUND OF THE INVENTION

1. Field of the Invention

The present invention relates to a liquid crystal display (LCD) device and a method for driving an LCD device, and more particularly, to an In-Plane-Switching (IPS) LCD device and a method for driving an IPS LCD device.

2. Description of the Related Art

In general, a liquid crystal display (LCD) device is formed by attaching a thin film transistor (TFT) array substrate and a color filter (CF) substrate together to face each other with a certain cell gap therebetween, and filling the cell gap with a liquid crystal material. A plurality of gate lines arranged at regular intervals along a horizontal direction and a plurality of data lines arranged at regular intervals along a longitudinal direction are formed on the TFT array substrate to intersect each other, thereby forming pixel regions each having a switching device and a pixel electrode at every intersection of the gate and data lines. In addition, red, green and blue color filters corresponding to the pixel regions are formed on the CF substrate, and a black matrix for preventing color interference of light passing through the pixel regions is formed in a matrix configuration that encompasses an outer edge of the color filters. Furthermore, a common electrode for supplying an electric field in conjunction with pixel electrodes in the pixel regions to the liquid crystal material.

Twisted nematic (TN) liquid crystal material is commonly used in LCD devices, and is driven by a vertical electric field formed between the pixel electrode and the common electrode. Accordingly, the TN liquid crystal material varies light transmittance according to a viewing angle of an observer. Thus, use of the TN liquid crystal material is limited for use in large-sized LCD devices. For example, since light transmittance is symmetrical along a horizontal direction and is asymmetrical along a vertical direction, an image is inverted along the vertical direction, thereby narrowing the viewing angle of the observer. In order to solve such problems, an IPS liquid crystal display device in which a liquid crystal material is driven by a horizontal electric field has been proposed.

The IPS LCD device may improve angular field characteristics, such as contrast, gray inversion, and color shift, in order to obtain a wide angular viewing field, as compared to the LCD device in which the liquid crystal material is driven by the vertical electric field. Accordingly, the IPS LCD device is commonly used in the large-sized LCD devices.

FIG. 1A is a schematic plan view of a TFT array substrate of an IPS LCD device according to the related art. In FIG. 1A, a plurality of gate lines (G1~Gn) are arranged parallel to one another along a horizontal direction and a plurality of data lines (D1~Dm) are arranged parallel to one another along a longitudinal direction. Accordingly, the gate lines (G1~Gn) and the data lines (D1~Dm) intersect at right angles, and a pixel region P1 is defined at each of the intersections. In order to control image information supplied to a pixel electrode 11, a switching device, such as a TFT TFT1, is provided at each of the pixel regions P1.

Although not shown, gate electrodes of each of the TFTs TFT1 are connected to the gate lines (G1~Gn), source electrodes are connected to data lines (D1~Dn), and drain electrodes are connected to the pixel electrode 11 in the pixel region P1. Accordingly, when scan signals of the LCD device are sequentially supplied to the gate lines (G1~Gn), the TFTs TFT1 are sequentially turned ON by the gate lines (G1~Gn). Thus, an electric conduction channel is formed between the source electrode and the drain electrode of each of the TFTs TFT1 that are turned ON by the gate lines (G1~Gn), and the electric conduction channel supplies image information supplied to the source electrode of the TFTs TFT1 through the data lines (D1~Dn), to the drain electrode. Since the drain electrode is connected to the pixel electrode 11, the image information is supplied to the pixel electrode 11. At least one of the pixel electrodes 11 in the pixel region P1 is patterned along a direction parallel to the data lines (D1~Dn).

In the pixel region P1, the common electrode 13 formed parallel to the pixel electrode 11, which corresponds to the pixel electrode 11, generates a horizontal electric field together with the pixel electrode 11, thereby driving the liquid crystal material using an in-plane switching method. Similarly, like the pixel electrode 11, at least one of the common electrode 13 in the pixel region P1 is patterned.

A common voltage is supplied to the common electrode 13 formed in the pixel region P1 through common voltage lines (Vcom1~Vcomm), the common voltage lines (Vcom1~Vcomn) that are arranged parallel to the gate lines (G1~Gn). In addition, one side of each of the common voltage lines is electrically connected to one side of each of the gate lines, thereby supplying the same common voltage to every pixel electrode 11.

Since the pixel electrode 11 is electrically connected to a storage capacitor (not shown), the image information supplied to the pixel electrode 11 is charged in the storage capacitor during a turn-ON period of the TFT TFT1, in which scan signals are supplied. Accordingly, the charged image information maintains a driving of the liquid crystal material by being supplied to the pixel electrode 11 during a turn-OFF period of the TFT TFT1, in which the scan signal are not supplied.

FIG. 1B is a schematic plan view of an equivalent circuit of pixels of the TFT array substrate of FIG. 1A according to the related art. In FIG. 1B, a pixel region P1 includes a TFT TFT1 having a gate electrode connected to a gate line (G1~Gn) and a source electrode connected to a data line (D1~Dn). In addition, a parasitic capacitor Clc is formed due to a capacitance of the liquid crystal material and a storage capacitor Cst is formed that both are connected in parallel between a drain electrode and the common voltage lines (Vcom1~Vcomm) of the TFT TFT1.

When an electric field is continuously supplied to the liquid crystal material, the liquid crystal material deteriorates, thereby causing afterimages by a DC voltage component. Accordingly, in order to prevent deterioration of the liquid crystal material and to eliminate the DC voltage component, a positive (+) voltage and a negative (−) voltage of the image information are repeatedly supplied on the basis of the common voltage. Such a driving method is commonly called an inversion driving method.

Among the different types of inversion driving methods, there are a frame inversion driving method in which a polarity of image information is inverted by a unit of frame and then supplied, a line inversion driving method in which a polarity of image information is inverted by a unit of the gate line and then supplied, and a dot inversion driving method in which a polarity of image information is inverted by pixels adjacent to each other and then supplied, and also inverted by a unit of the frame of the image and then supplied. The dot inversion driving method of the above inversion driving methods may restrict image distortion, such as flicker or cross talk more effectively than the other inversion driving methods, thereby producing quality images.

FIG. 2 is a schematic diagram of voltage waveforms of a dot inversion method according to the related art. In FIG. 2, a common voltage (Vcom) is maintained as a DC voltage, and scan signals are sequentially supplied to gate lines in every frame. A positive polarity and a negative polarity of the image information ($V_{DATA}$) are inverted by pixels adjacent to each other based on a common voltage and then supplied, and are also inverted by a unit of frame based on the common voltage and supplied.

During a turn-ON period in which the scan signals ($V_{G1}$~$V_{G3}$) are supplied having high electric potential, image information ($V_{DATA}$) supplied to the pixel electrode is charged in the storage capacitor and has a pixel voltage (Vp) waveform. In addition, when the scan signals ($V_{G1}$~$V_{G3}$) are transited to a low electric potential, the pixel voltage (Vp) drops due to coupling of a parasitic capacitor according to overlap of the gate electrode and the drain electrode of the thin film transistor. The dropped amount of the pixel voltage (Vp) is commonly referred to as a range of fluctuation ($\Delta$Vp) of the pixel electrode.

During a turn-OFF period of the TFT, in which the scan signals ($V_{G1}$~$V_{G3}$) are supplied with a low electric potential, the pixel voltage (Vp) charged in the storage capacitor is continuously supplied to the pixel electrode to maintain a driving of the liquid crystal material.

A voltage difference ($V_{DATA}$-Vcom) obtained by subtracting the common voltage (Vcom) from the image information ($V_{DATA}$) is commonly defined as a liquid crystal driving voltage (Vcel). Thus, in order that the liquid crystal driving voltage (Vcel) drives the liquid crystal material, the image information ($V_{DATA}$) should be supplied with a voltage level more than, the common voltage (Vcom). However, this causes an increase in power consumption.

In addition, a magnitude of the liquid crystal driving voltage (Vcel) is dependent upon the image information because the common voltage (Vcom) is fixed at the specific level. In order to form a high electric field in the liquid crystal material, a source integrated circuit having a high output voltage should be used.

Furthermore, in the IPS LCD device, if an interval between a pixel electrode and a common electrode increases in order to obtain a high aperture ratio, a higher driving voltage is required in order to obtain a required brightness, thereby greatly increasing power consumption.

SUMMARY OF THE INVENTION

Accordingly, the present invention is directed to an LCD device and a method for driving an LCD device that substantially obviates one or more of the problems due to limitations and disadvantages of the related art.

An object of the present invention is to provide an LCD device having reduced power consumption.

Another object of the present invention is to provide a method for driving an LCD device having reduced power consumption.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display device includes a plurality of pixel regions arranged on a first substrate, a plurality of first electrodes and a plurality of second electrodes individually provided at the pixel regions to form a horizontal electric field, a plurality of gate lines arranged on the first substrate along a horizontal direction to supply scan signals to the pixel regions, a plurality of data lines arranged on the first substrate along a longitudinal direction to supply image information to the pixel regions, a plurality of switching devices each provided at each of the pixel regions and having a first terminal connected to one of the gate lines, a second terminal connected to one of the data lines, and a third terminal connected to a first electrode of the pixel region, a plurality of first common voltage lines supplying a first common voltage to the second electrodes provided at the pixel regions of every odd-numbered first common voltage line, and a plurality of second common voltage lines supplying a second common voltage to second electrodes provided at the pixel regions of every even-numbered second common voltage line, wherein the first terminal of each of the switching devices provided at the pixel regions of a line unit is alternately connected to a $N^{th}$ gate line and a $N+1^{th}$ gate line (where N is an integer).

In another aspect, a method for driving a liquid crystal display employing an in-plane switching (IPS) in which pixel regions are arranged on a first substrate and a horizontal electric field is supplied to a liquid crystal layer through a first electrode and a second electrode provided at the pixels, includes alternately connecting first terminals of a plurality of switching devices provided at the pixel regions of a line unit to an N gate line and an $N+1^{th}$ gate line (where N is an integer), supplying a first common voltage having a pulse form transited by a unit of frame to second electrodes provided at every odd-numbered line of the pixel regions, and supplying a second common voltage having a pulse form of an inverted first common voltage transited by a unit of frame to second electrodes provided at every even-numbered line of the pixel regions.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1A:
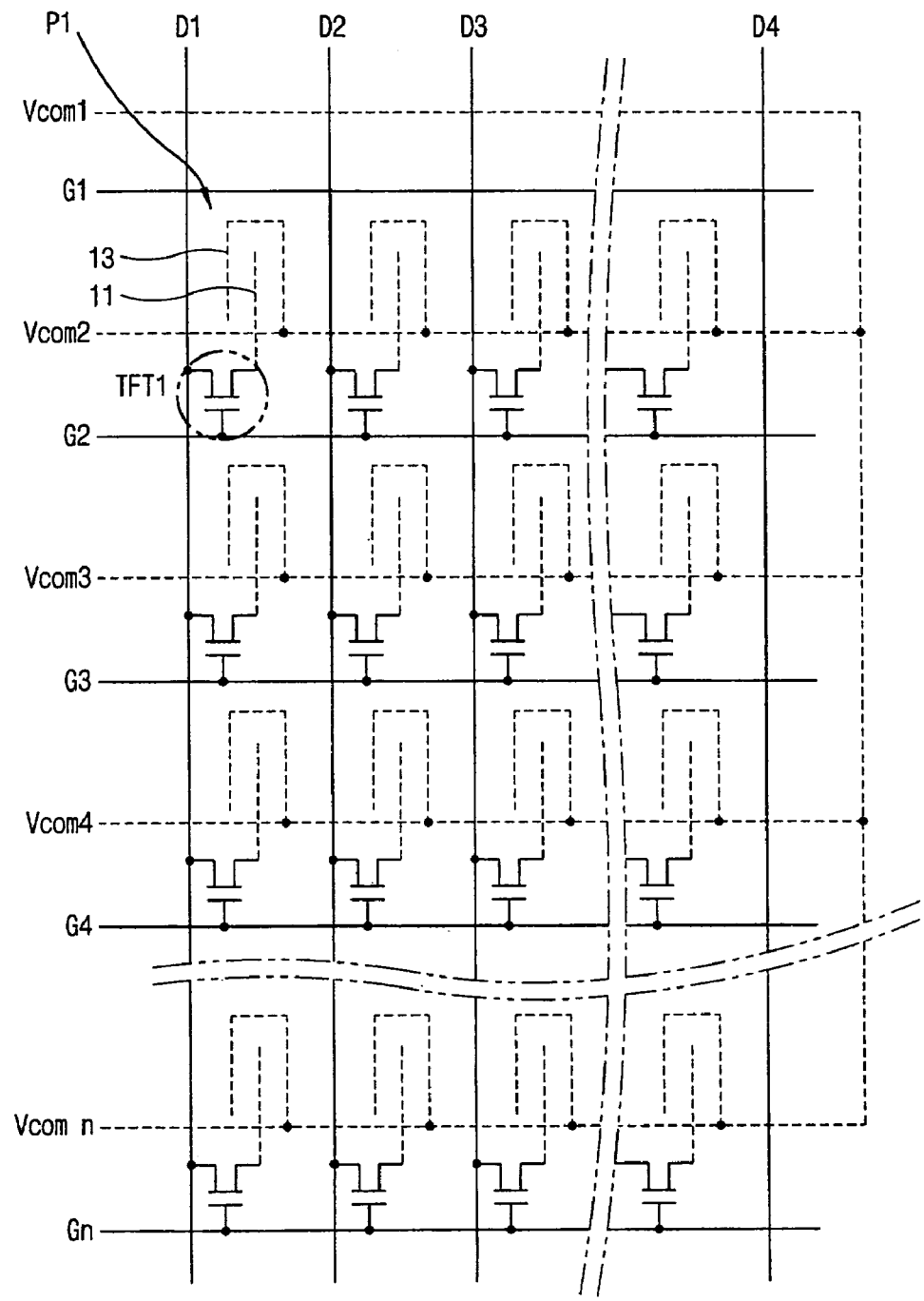
FIG. 1A is a schematic plan view of a TFT array substrate of an IPS LCD device according to the related art.
Figure 1B:
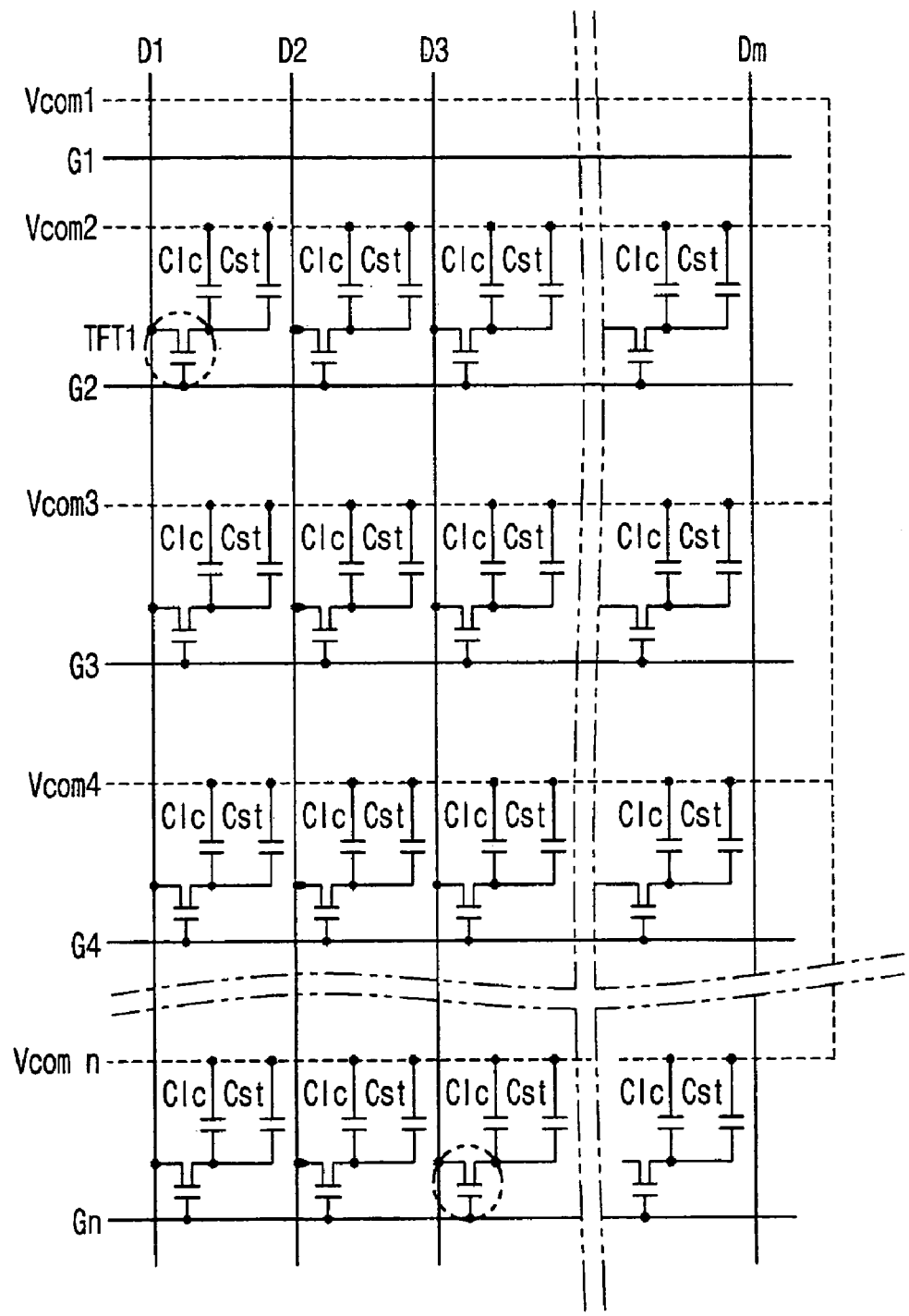
FIG. 1B is a schematic plan view of an equivalent circuit of pixels of the TFT array substrate of FIG. 1A according to the related art.
Figure 2:
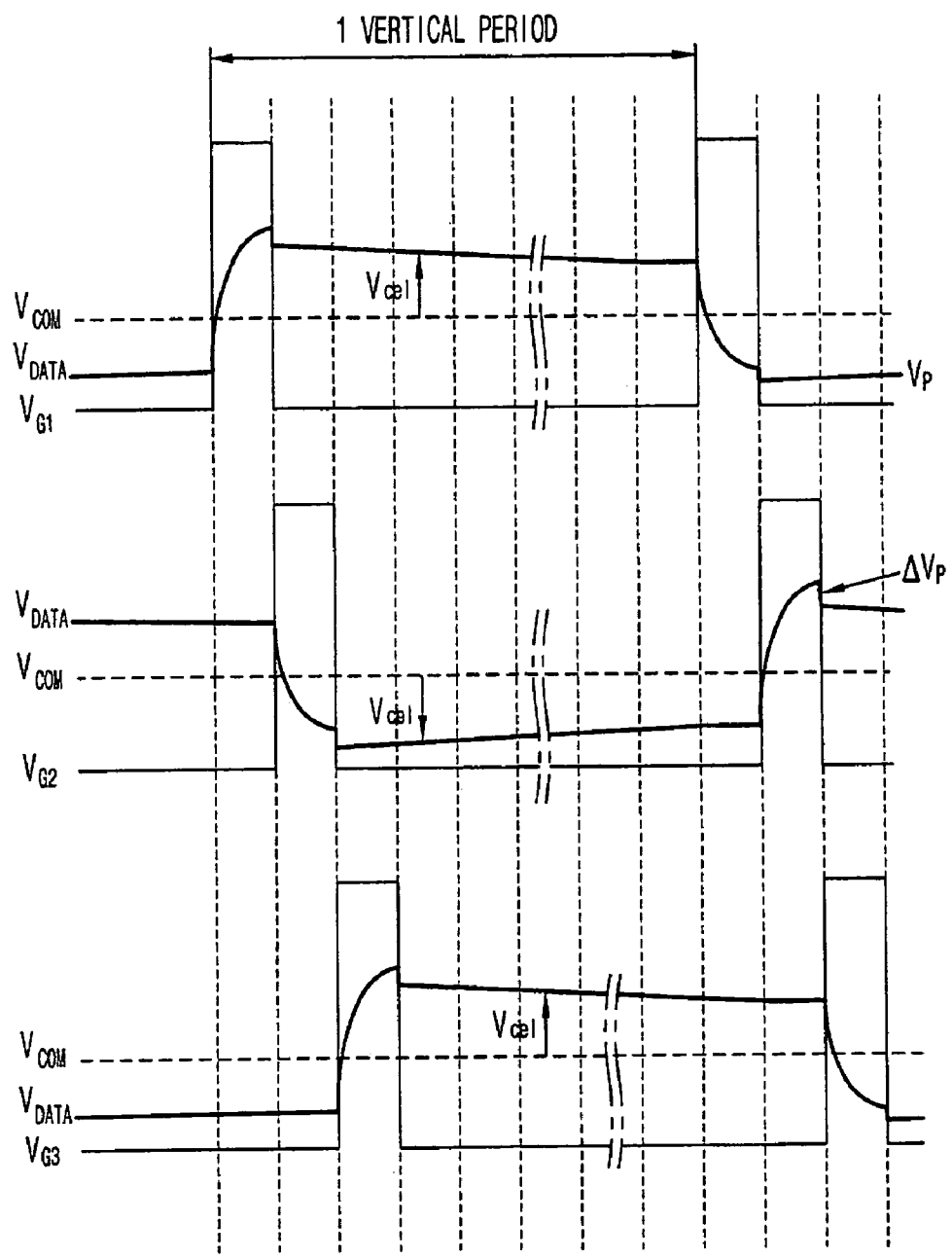
FIG. 2 is a schematic diagram of voltage waveforms of a dot inversion method according to the related art.
Figure 3A:
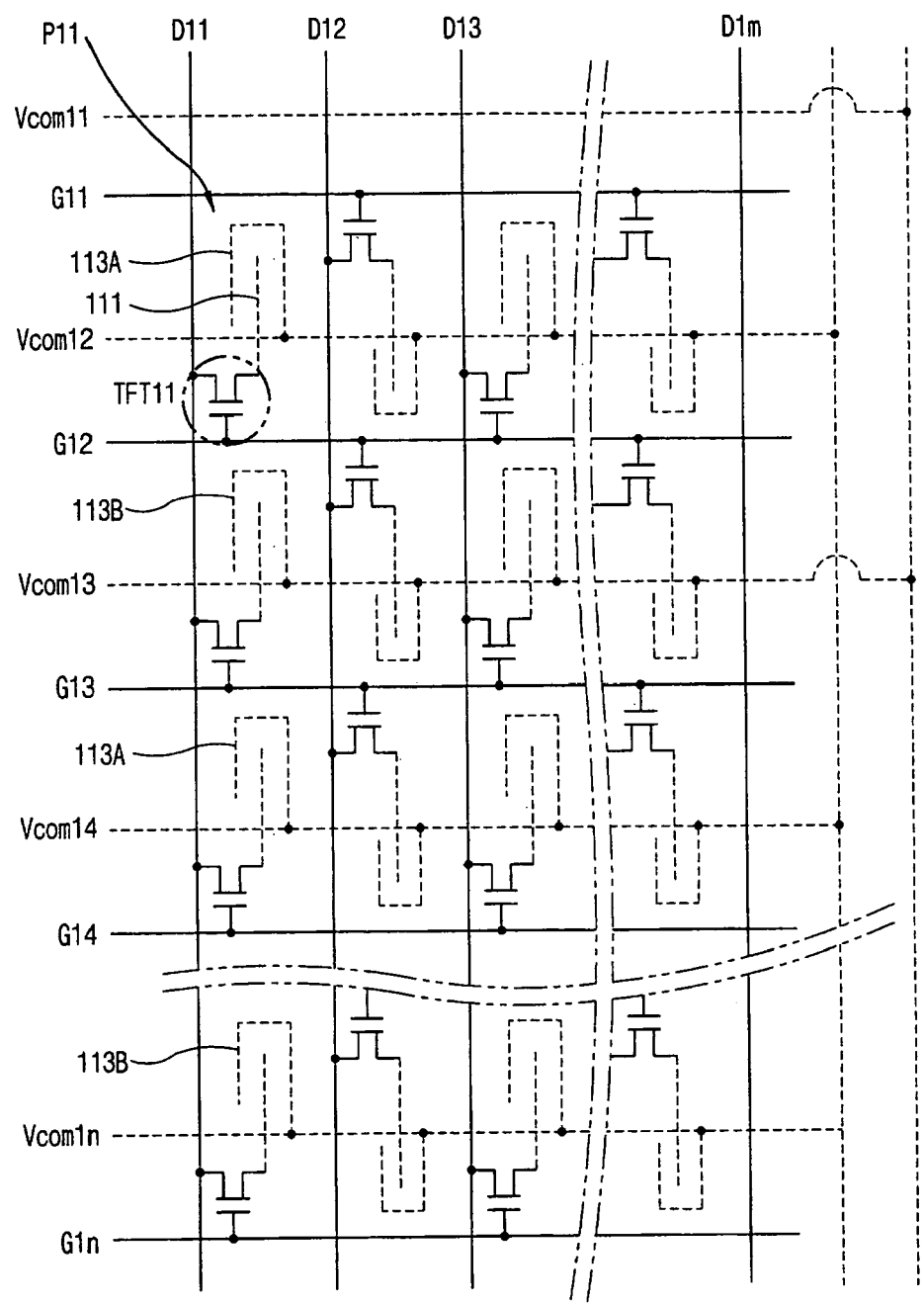
FIG. 3A is an exemplary schematic plan view of a TFT array substrate of an IPS LCD device according to the present invention.

FIG. 3A is an exemplary schematic plan view of a TFT array substrate of an IPS LCD device according to the present invention. In FIG. 3A, a plurality of gate lines (G11~G1n) may be arranged at regular intervals along a horizontal direction on a substrate and a plurality of data lines (D11~D1m) may be arranged at regular intervals along a longitudinal direction on the substrate. The substrate is a TFT array substrate. Accordingly, the gate lines (G11~G1n) and the data lines (D11~D1m) may intersect and a pixel region P11 may be defined at the intersection. In addition, a switching device TFT11, such as a TFT, for supplying image information to a pixel electrode 111 provided at each of the pixel regions P11. A gate driving unit that supplies scan signals to the gate lines (G11~G1n) is connected electrically to the substrate, and a data driving unit that supplies image information to the data lines (D11~D1m) is connected electrically to the substrate.

In FIG. 3A, gate electrodes of the TFTs TFT11 may be connected to the gate lines (G11~G1n), source electrodes may be connected to the data lines (D11~D1m), and drain electrodes may be connected to the pixel electrodes 111 in each of the pixel regions P11. Accordingly, one of two gate lines that define a pixel region may correspond to an $N^{th}$ gate line, and another one of the two gate lines may correspond to an $N+1^{th}$ gate line, wherein N is an integer. Thus, the gate electrode of the TFT (TFT11) is alternately connected to the $N^{th}$ gate line and the $N+1^{th}$ gate line.

When the gate driving unit supplies scan signals sequentially to the gate lines (G11~G1n), the TFTs TFT11 may be turned-ON by the corresponding gate line. Accordingly, an electric conduction channel may be formed between the source electrode and the drain electrode of the turned-ON TFT TFT11, and the data driving unit may supply image information to the data line (D11~D1m), and the image information supplied to the source electrode of the TFT through the data lines (D11~D1m) may be supplied to the drain electrode of the TFT. Since the drain electrode is connected to the pixel electrode 111, the image information is supplied to the pixel electrode 11 through the drain electrode.

In the pixel region P11, the common electrode 113 formed corresponding to the pixel electrode 111 generates a horizontal electric field together with the pixel electrode 111, thereby driving the liquid crystal material by an IPS mode. In addition, one or more of the common electrodes 113 may be patterned in each of the pixel regions P11 along a direction parallel to the data lines (D11~D1m). Furthermore, a common voltage may be supplied from common voltage lines (Vcom11~Vcom1n) to the common electrode 113 formed in the pixel region P11. The common voltage lines (Vcom11~Vcom1n) may be arranged at regular intervals to be parallel to the gate lines (G11~G1n), wherein every odd-numbered common voltage line ( . . . , Vcom11, Vcom13, . . . ) may be electrically connected to one another. Likewise, every even-numbered common voltage line ( . . . , Vcom12, Vcom14 . . . , Vcom1n) may be electrically connected to one another. Every even-numbered common voltage line ( . . . , Vcom12, Vcom14, . . . ) may supply a second common voltage having a pulse form transited by a unit of frame to the common electrodes 113A of the pixels. In addition, every odd-numbered common voltage line ( . . . , Vcom11, Vcom13, . . . ) may supply a first common voltage having a pulse form of an inverted second common voltage to a common electrode 113B of the pixels. Accordingly, the LCD device in accordance with the present invention may be driven by image information supplied to the pixel electrode 111, and the first and second common voltages supplied to the common electrode 113A and 113B.

Since the pixel electrode 111 may be electrically connected to a storage electrode of a storage capacitor (not shown) provided at the pixel region P11, the image information supplied to the pixel electrode 111 may be charged in the storage capacitor during a turn-ON period of the TFT TFT11, in which a scan signal is supplied. The image information charged in the storage capacitor may maintain a driving of the liquid crystal material by being supplied to the pixel electrode 111 during a TFT turn-OFF period in which a scan signal is not supplied.

Figure 3B:
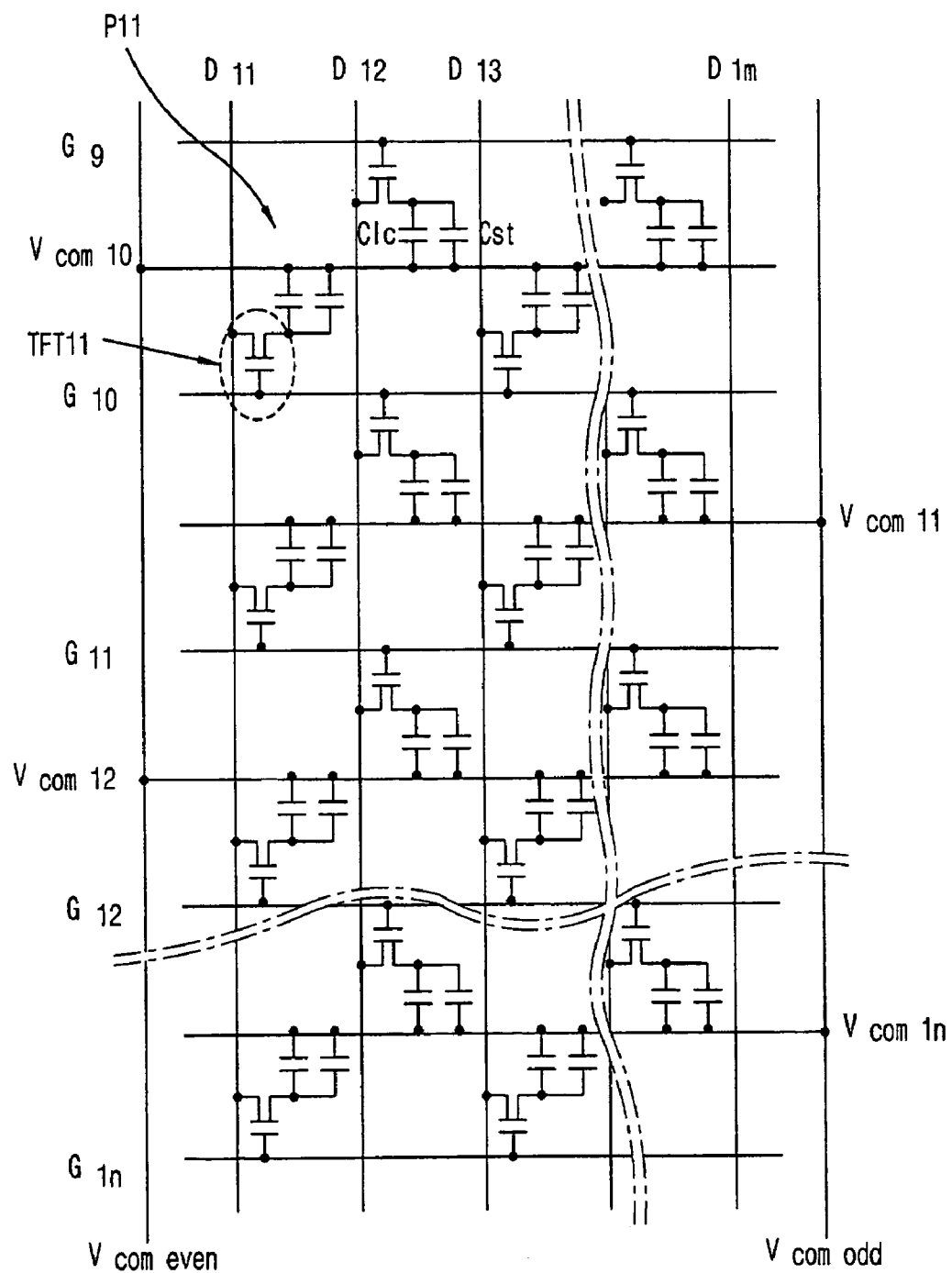
FIG. 3B is an exemplary schematic plan view of an equivalent circuit of pixels the TFT array substrate of FIG. 3A according to the present invention.

FIG. 3B is an exemplary schematic plan view of an equivalent circuit of pixels the TFT array substrate of FIG. 3A according to the present invention. In FIG. 3B, a pixel region P11 may include a TFT TFT11 each having a gate electrode connected to a gate line (G9~G1n), a source electrode connected to a data line (D11-D1m), and a parasitic capacitor (Clc) due to a capacitance of the liquid crystal material and a storage capacitor that are both connected in parallel between the drain electrode of the TFTs TFT11 and a common voltage line (Vcom10~Vcom1n). The TFTs TFT11 formed in the pixel regions P11 of a line unit may be alternately connected to an $N^{th}$ gate line and an $N+1^{th}$ gate line, and the parasitic capacitors (Clc) and the storage capacitors (Cst) may be connected to one common voltage line. Thus, dot inversion-type image information that is inverted by adjacent pixels may be supplied to the data lines (D11~D1m).

Every even-numbered common voltage line ( . . . , Vcom12, Vcom14, . . . ) may supply a second common voltage having a pulse form transited by a unit of frame to a common electrode 113A of the pixels. In addition, every odd-numbered common voltage line ( . . . , Vcom11, Vcom13, . . . ) may supply a first common voltage having a pulse form of the inverted second common voltage to a common electrode 113B of the pixels.

A common voltage inversion supplying method in which a common voltage is transited frame by frame is advantageous in that power consumption of the LCD device may be reduced. For example, when a common voltage is supplied with a high electric potential, image information of a negative (−) polarity may be supplied, and when a common voltage is applied with a low electric potential, image information of a positive (+) polarity may be applied, so that a voltage difference between the common voltage and each image information may be increased. According to the common voltage inversion supplying method, if the dot inversion method is employed for supplying image information, positive (+) and negative (−) image information may be simultaneously supplied to the pixels of a line unit. Thus, effects of the common voltage inversion supplying method may be degraded.

For example, during the dot inversion method, if a common voltage is a high potential, image information of a positive (+) polarity may be supplied, and if a common voltage is a low potential, image information of a negative (−) polarity may be supplied, thereby reducing a voltage difference between the common voltage and the image information. Thus, when the common voltage inversion applying method is employed, a line inversion method in which image information of the same polarity is supplied to the pixels of the line unit may be used in order to obtain a large voltage difference between the common voltage and the image information. But, the line inversion method is disadvantageous in that image quality is degraded since it has a small effect on preventing deterioration of driving such as flicker or cross talk, as compared to the dot inversion method.

Therefore, a method of changing a pixel arrangement of the liquid crystal display device is proposed so that even though the dot inversion method is used instead of the line inversion method, the effect of the common voltage supplying method can be still obtained.

As shown in FIG. 3B, the LCD device according to the present invention includes alternately connecting a first terminal of a thin film transistor in the pixels of the line unit to an $N^{th}$ gate line and an $N+1^{th}$ gate line. Thus, the LCD device may be driven by the dot inversion method. In other words, when dot inversion type image information having a pulse form which is inverted by pixels adjacent to each other is input, image information having the same polarity may be supplied to a switching device connected to the $N^{th}$ gate line. In addition, image information may be supplied to switching devices connected to the $N+1^{th}$ gate line having the same polarity as the image information supplied to the switching element connected to the $N^{th}$ gate line. Accordingly, the polarity of the image information may be inverted by pixels of the image information, and a connection position of the switching element may also be alternated. Thus, image information having the same polarity may be supplied to pixels of the line unit, defined by the $N^{th}$ gate line and the $N+1^{th}$ gate line to obtain an effect of the common voltage inversion applying method, wherein a large voltage difference is produced between the common voltage and the image information.

Figure 4:
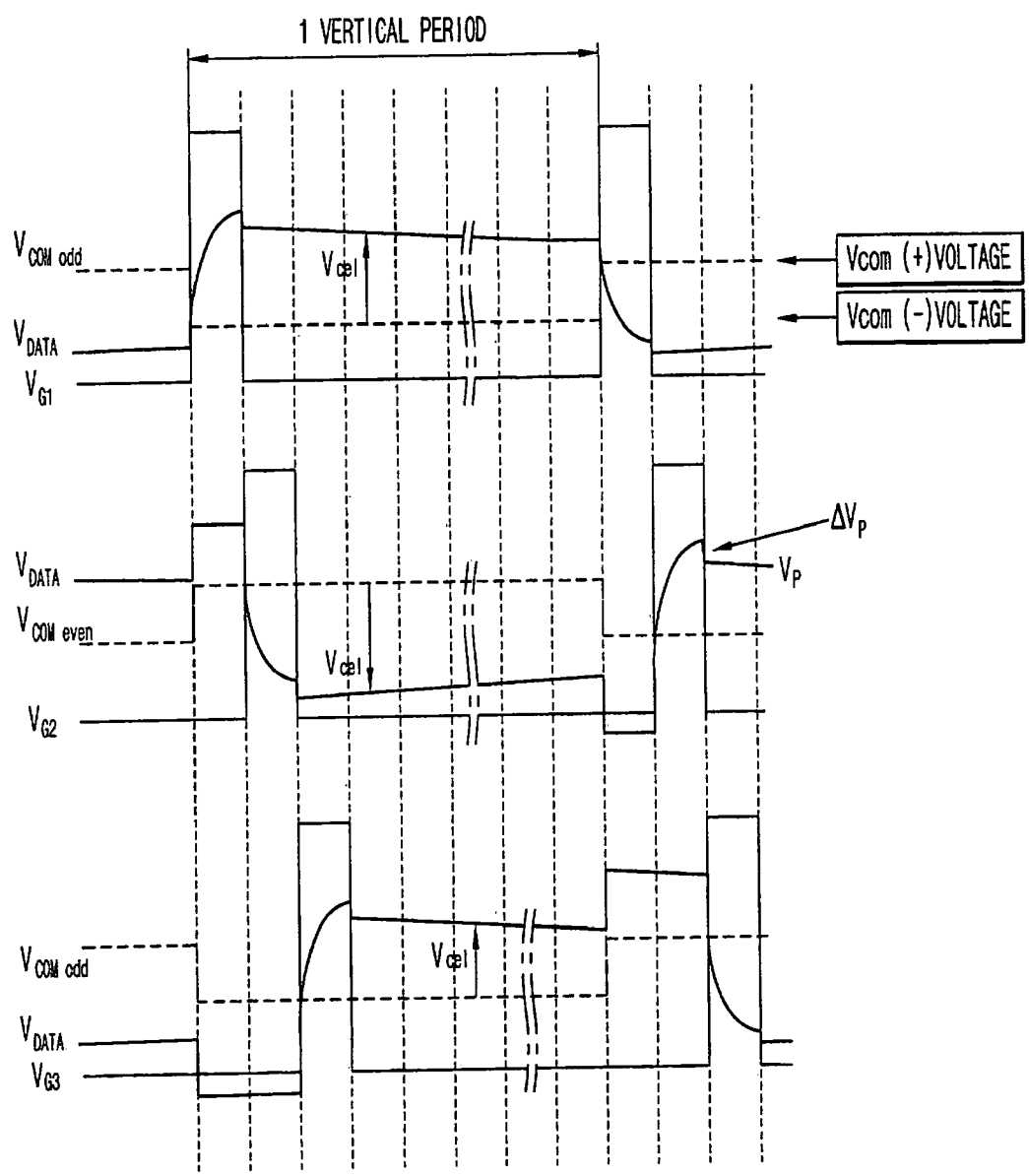
FIG. 4 is an exemplary schematic diagram of voltage waveforms applied to pixels of an IPS LCD device according to the present invention.

FIG. 4 is an exemplary schematic diagram of voltage waveforms applied to pixels of an IPS LCD device according to the present invention. In FIG. 4, a first common voltage (Vcom odd) having a pulse form transited frame by frame may be supplied to common electrodes of corresponding pixels through every odd-numbered common voltage line. In addition, a second common voltage (Vcom even) having a pulse form of an inverted first common voltage (Vcom odd) may be supplied to common electrodes of corresponding pixels through every even-numbered common voltage line. Accordingly, scan signals ( . . . , VG1, VG2, VG3, . . . ) may be sequentially supplied to gate lines at every horizontal period. Furthermore, the first common voltage having a pulse form and the second common voltage having a pulse form of the inverted first common voltage may be supplied at the same time and transited at every vertical period.

When a liquid crystal display device is driven as above, a liquid crystal driving voltage (Vcel) between a common electrode and a pixel electrode may become relatively large. For this reason, even if a voltage supplied to a liquid crystal is set to be relatively low voltage, a liquid crystal driving voltage (Vcel) that may drive a plurality of pixels, thereby minimizing power consumption. The liquid crystal driving voltage supplied to the pixel electrode may be shifted by a capacitive coupling effect due to the inversion of a corresponding common voltage. However, a voltage difference formed in the liquid crystal material of a pixel may be maintained to be the same as an existing value.

Figure 5:
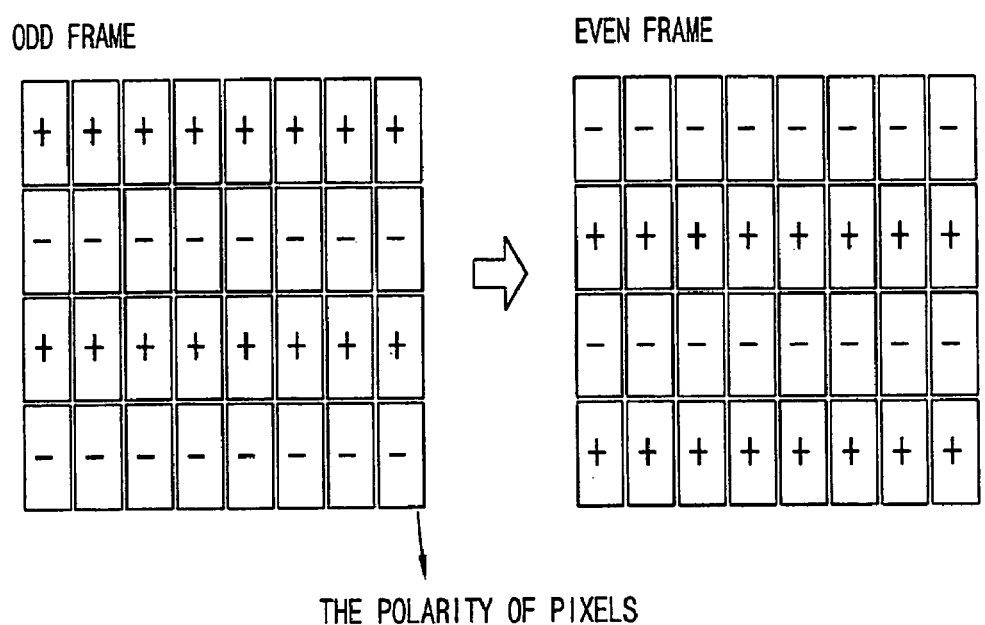
FIG. 5 is a schematic polarity diagram of a pixel of an IPS LCD device according to the present invention.

FIG. 5 is a schematic polarity diagram of a pixel of an IPS LCD device according to the present invention. In FIG. 5, an inversion method used for the present invention may be a dot inversion method in which the polarity of image information supplied to a pixel through a data line may be inverted by pixels and also inverted at every horizontal period and every vertical period. Accordingly, by using the dot inversion method, a degradation of an image, such as flicker or cross talk, may be prevented, as compared to line inversion or frame inversion methods.

The dot inversion method is used for a driving method of the present invention, however, pixels of the line unit may be displayed in a visual form which may be similar as that under a driving by a line inversion method in which pixels of the line unit have the same polarity. This is because switching devices may be alternately connected to an $N^{th}$ gate line and an $N+1^{th}$ gate line.

As shown in FIG. 5, the polarity of pixels may be inverted by a unit of line in each frame and also inverted by a unit of frame. An actual image configuration may be implemented by the line inversion method, but the supply of the image information through data lines may be made by the dot inversion method, thereby preventing degradation of driving, such as flicker and cross talk, as much as possible and thus producing high quality images.

According to the present invention, a voltage difference supplied to a LCD device may increase, even if a voltage supplied to a liquid crystal material is set to be relatively low, thereby minimizing power consumption. In addition, even if an isolation distance between a pixel electrode and a common electrode increases, a plurality of pixels may be driven, thereby expanding an area in which the pixel electrode and the common electrode are isolated and thus improving an aperture ratio.

It will be apparent to those skilled in the art that various modifications and variations can be made in the LCD device and the method for driving an LCD device of the present invention without departing from the spirit or scope of the invention. Thus, it is intended that the present invention cover the modifications and variations of this invention provided they come within the scope of the appended claims and their equivalents.

What is claimed is:

1. A liquid crystal display device, comprising:

a plurality of pixel regions arranged on a substrate;

a plurality of first electrodes and a plurality of second electrodes individually provided at the pixel regions to form a horizontal electric field;

a plurality of gate lines arranged on the substrate along a horizontal direction to supply scan signals to the pixel regions;

a plurality of data lines arranged on the substrate along a longitudinal direction to supply image information to the pixel regions;

a plurality of switching devices each provided at each of the pixel regions and having a first terminal connected to one of the gate lines, a second terminal connected to one of the data lines, and a third terminal connected to the first electrode of the pixel region;

a plurality of first common voltage lines supplying a first common voltage to the second electrodes provided at the pixel regions of every odd-numbered line; and a plurality of second common voltage lines supplying a second common voltage to the second electrodes provided at the pixel regions of every even-numbered line, wherein the first terminal of each of the switching devices provided at the pixel regions of a line unit is alternately connected to a $N^{th}$ gate line and a $N+1^{th}$ gate line (where N is an integer).

2. The device according to claim 1, wherein the switching devices include thin film transistors in which a gate electrode is supplied as the first terminal, a source electrode is supplied as the second terminal, and a drain electrode is supplied as the third terminal.

3. The device according to claim 1, wherein the first common voltage lines are arranged parallel to the gate lines and electrically connected to one another, and the second common voltage lines are arranged parallel to the gate lines and electrically connected to one another.

4. The device according to claim 1, wherein the first electrode is a pixel electrode.

5. The device according to claim 1, wherein the second electrode is a common electrode.

6. The device according to claim 1, wherein the first common voltage having a pulse form transited by a unit of frame is supplied to the first common voltage lines and the second common voltage having a pulse form of an inverted first common voltage is supplied to the second common voltage lines.

7. The device according to claim 1, wherein at least one common electrode is formed at a pixel region and is connected to one of the first common voltage lines and the second common voltage lines.

8. The device according to claim 1, wherein the substrate is a TFT array substrate.

9. A method for driving a liquid crystal display employing an in-plane switching (IPS) in which pixel regions are arranged on a substrate and a horizontal electric field is supplied to a liquid crystal layer through a first electrode and a second electrode provided at the pixels, comprising:

alternately connecting first terminals of a plurality of switching devices provided at the pixel regions of a line unit to an $N^{th}$ gate line and an $N+1^{th}$ gate line (where N is an integer);

supplying a first common voltage having a pulse form transited by a unit of frame to the second electrodes provided at every odd-numbered line of the pixel regions; and supplying a second common voltage having a pulse form of an inverted first common voltage to second electrodes provided at every even-numbered line of the pixel regions.

10. The method according to claim 9, wherein the first common voltage is supplied through first common voltage lines arranged parallel to the gate lines corresponding to every odd-numbered line of the pixel regions.

11. The method according to claim 9, wherein the second common voltage is supplied through second common voltage lines arranged parallel to the gate lines corresponding to every even-numbered line of the pixel regions.

12. The method according to claim 9, wherein image information is supplied to the pixel regions by a dot inversion method.

13. The method according to claim 12, wherein the pixel regions are driven as a line inversion.

* * * * *